(12) United States Patent
Swartz et al.

(10) Patent No.: US 11,806,931 B2
(45) Date of Patent: Nov. 7, 2023

(54) BULK INK BAGS FOR 3-DIMENSIONAL PRINTING

(71) Applicant: Impossible Objects, Inc., Northbrook, IL (US)

(72) Inventors: Robert Swartz, Highland Park, IL (US); Leonard Wanger, Chicago, IL (US); John Bayldon, Evanston, IL (US); Drew Marschner, Chicago, IL (US); Michael Rohrer, Third Lake, IL (US); Gintaras Vaisnys, Chicago, IL (US); Giovanni Meier, Madison, CT (US)

(73) Assignee: Impossible Objects, Inc., Northbrook, IL (US)

( * ) Notice: Subject to any disclaimer, the term of this patent is extended or adjusted under 35 U.S.C. 154(b) by 332 days.

(21) Appl. No.: 17/156,540

(22) Filed: Jan. 23, 2021

(65) Prior Publication Data
US 2021/0229355 A1    Jul. 29, 2021

Related U.S. Application Data

(60) Provisional application No. 62/965,083, filed on Jan. 23, 2020.

(51) Int. Cl.
| | |
|---|---|
| *B29C 64/259* | (2017.01) |
| *B33Y 40/00* | (2020.01) |
| *B29C 64/307* | (2017.01) |
| *B33Y 30/00* | (2015.01) |
| *B33Y 50/00* | (2015.01) |
| *B29C 64/386* | (2017.01) |
| *B22F 12/90* | (2021.01) |
| *B22F 12/53* | (2021.01) |

(Continued)

(52) U.S. Cl.
CPC ............ *B29C 64/259* (2017.08); *B22F 12/50* (2021.01); *B22F 12/53* (2021.01); *B22F 12/70* (2021.01); *B22F 12/90* (2021.01); *B29C 64/307* (2017.08); *B29C 64/386* (2017.08); *B33Y 30/00* (2014.12); *B33Y 40/00* (2014.12); *B33Y 50/00* (2014.12)

(58) Field of Classification Search
CPC ..... B29C 64/259; B29C 64/307; B33Y 30/00; B33Y 40/00
See application file for complete search history.

(56) References Cited

U.S. PATENT DOCUMENTS

| | | | |
|---|---|---|---|
| 5,638,989 A * | 6/1997 | Ophardt ............... | A47K 5/1207 222/105 |
| 9,393,770 B2 | 7/2016 | Swartz | |

(Continued)

FOREIGN PATENT DOCUMENTS

| | | | | |
|---|---|---|---|---|
| EP | 1273451 A2 * | 1/2003 | .......... | B41J 2/17509 |

*Primary Examiner* — Jeremy Carroll
(74) *Attorney, Agent, or Firm* — Dunlap Bennett & Ludwig, PLLC

(57) ABSTRACT

A bulk ink bag system in a composite-based additive manufacturing process (CBAM) keeps the inkjet heads (cartridges) on printers filled to the proper level of fluid at all times while the process runs. The system includes gravity fed fluid delivery without requiring pumps; is simple to connect and disconnect to system plumbing; has the ability to change ink bags without interrupting the print job or introducing air bubbles into the ink supply; and has the ability to disconnect partially used bags and reconnect them later.

6 Claims, 2 Drawing Sheets

(51) Int. Cl.
*B22F 12/70* (2021.01)
*B22F 12/50* (2021.01)

(56) References Cited

U.S. PATENT DOCUMENTS

| | | |
|---|---|---|
| 9,776,376 B2 | 10/2017 | Swartz |
| 9,827,754 B2 | 11/2017 | Swartz |
| 9,833,949 B2 | 12/2017 | Swartz |
| 10,046,552 B2 | 8/2018 | Swartz |
| 10,252,487 B2 | 4/2019 | Swartz |
| 10,350,877 B2 | 7/2019 | Swartz |
| 10,377,080 B2 | 8/2019 | Swartz |
| 10,377,106 B2 | 8/2019 | Swartz |
| 10,384,437 B2 | 8/2019 | Swartz |
| 10,597,249 B2 | 3/2020 | Swartz |
| 10,751,987 B2 | 8/2020 | Swartz |
| 10,934,120 B2 | 3/2021 | Swartz |
| 11,666,158 B1 * | 6/2023 | Margetis ............... A01K 5/0283 222/77 |
| 2015/0091992 A1 * | 4/2015 | Kopp .................... B41J 2/17596 347/92 |
| 2017/0151719 A1 | 6/2017 | Swartz |
| 2017/0291223 A1 | 10/2017 | Swartz |
| 2018/0072001 A1 | 3/2018 | Swartz |
| 2018/0264725 A1 | 9/2018 | Swartz |
| 2018/0264732 A1 | 9/2018 | Swartz |
| 2019/0084046 A1 | 3/2019 | Swartz |
| 2019/0202164 A1 | 7/2019 | Swartz |
| 2019/0366626 A1 | 12/2019 | Swartz |
| 2020/0223131 A1 | 7/2020 | Swartz |
| 2020/0384783 A1 | 12/2020 | Swartz |

* cited by examiner

BULK INK BAGS FOR 3-DIMENSIONAL PRINTING

This application relates to, and claims priority from, U.S. Provisional Patent Application No. 62/965,083 filed Jan. 23, 2020. Application 62/965,083 and the following U.S. Pat. Nos. 9,393,770; 9,776,376; 9,827,754; 9,833,949; 10,046,552; 10,252,487; 10,377,080; 10,377,106; 10,384,437; 10,597,249 are hereby incorporated by reference in their entireties.

BACKGROUND

Field of the Invention

The present invention relates to 3-dimensional printing, and more particularly to bulk ink bag filling in a 3-D printing machine.

Description of the Problem Solved

Composite-Based Additive Manufacturing (CBAM) is a process where sections of a 3-dimensional object are printed on substrate sheets (e.g., carbon fiber) section-by-section using an inkjet printer or lithographic techniques. The printing typically uses an aqueous ink solution, but in some embodiments, can use other solutions or inks. The substrates are then flooded with a powder that can be a thermoplastic material, thermoset, metal or other powder. The powder adheres only to the wet (printed) portions of the substrate. Excess powder is removed from the sheets, and the sheets are stacked on top of one-another. The stack is typically compressed and heated causing the powder layers to fuse forming the 3-D object. Excess solid material can then be removed by abrasion, sand-blasting, chemical means or other removal technique.

The CBAM process typically uses inkjet heads to print a wetting fluid onto sheets of fabric. The fluid used in the inkjet heads has a very low viscosity being in many cases an aqueous solution. Since CBAM can be a continuous manufacturing process, it is costly and time-consuming when the heads run out of fluid (or get low on fluid). Filling them manually requires stopping the automatic process, opening the fluid reservoir for the one or more inkjet head(s) being used. The bulk, prepared fluid than must be poured into the reservoir.

Prior art 3-D printing systems typically provide liquid resins that can be of relatively high viscosity to ink jet heads through a bulk delivery system. This includes photopolymers in SLA systems from Stratsys (Polyjet) and 3D systems (Projet). Others provide jet binder fluids for powder bed systems such as HP, 3D systems (SLS) and Exone. All of these systems use rigid bottles of material and complicated pumping systems. All of these systems also differ from CBAM in numerous ways (e.g., not using sheets at all).

It would be extremely advantageous to have a system and method for keeping the ink reservoirs full or near full at all times while the process is running that does not require complex plumbing, and is simple to use.

SUMMARY OF THE INVENTION

The present invention relates to a bulk ink system that has been added to the CBAM printer to keep the inkjet heads filled to the proper level of fluid at all times while the process runs. The present invention has the following features:

Gravity fed fluid delivery without requiring pumps.
Simple to connect, and disconnect, plumbing.
Ability to change ink bags without interrupting the print job or introducing air bubbles into the ink supply.
Ability to disconnect partially used bags and reconnect them later.

DESCRIPTION OF THE FIGURES

Attention is now directed to several drawings that illustrate features of the present invention.

Several figures and illustrations have been provided to aid in understanding the present invention. The scope of the present invention is not limited to what is shown in the figures.

DESCRIPTION OF THE PREFERRED EMBODIMENTS

The CBAM ink delivery system of the present invention uses flexible Mylar™ bags filled with the wetting fluid. A flexible membrane allows the fluid to flow through a connector at the bottom of the bag without requiring a pump or adding air into the bag. A flexible tube provides fluid communication for the ink between the bottom of the ink bag and one or more ink reservoirs at the ink cartridge(s)/print head(s). The bag is hung on a metal hook which is also connected to a load cell to measure the weight of the bag. This allows the fluid level in the bag to be monitored, and an operator notified when the weight indicates the bag is low or empty.

Figure 1:
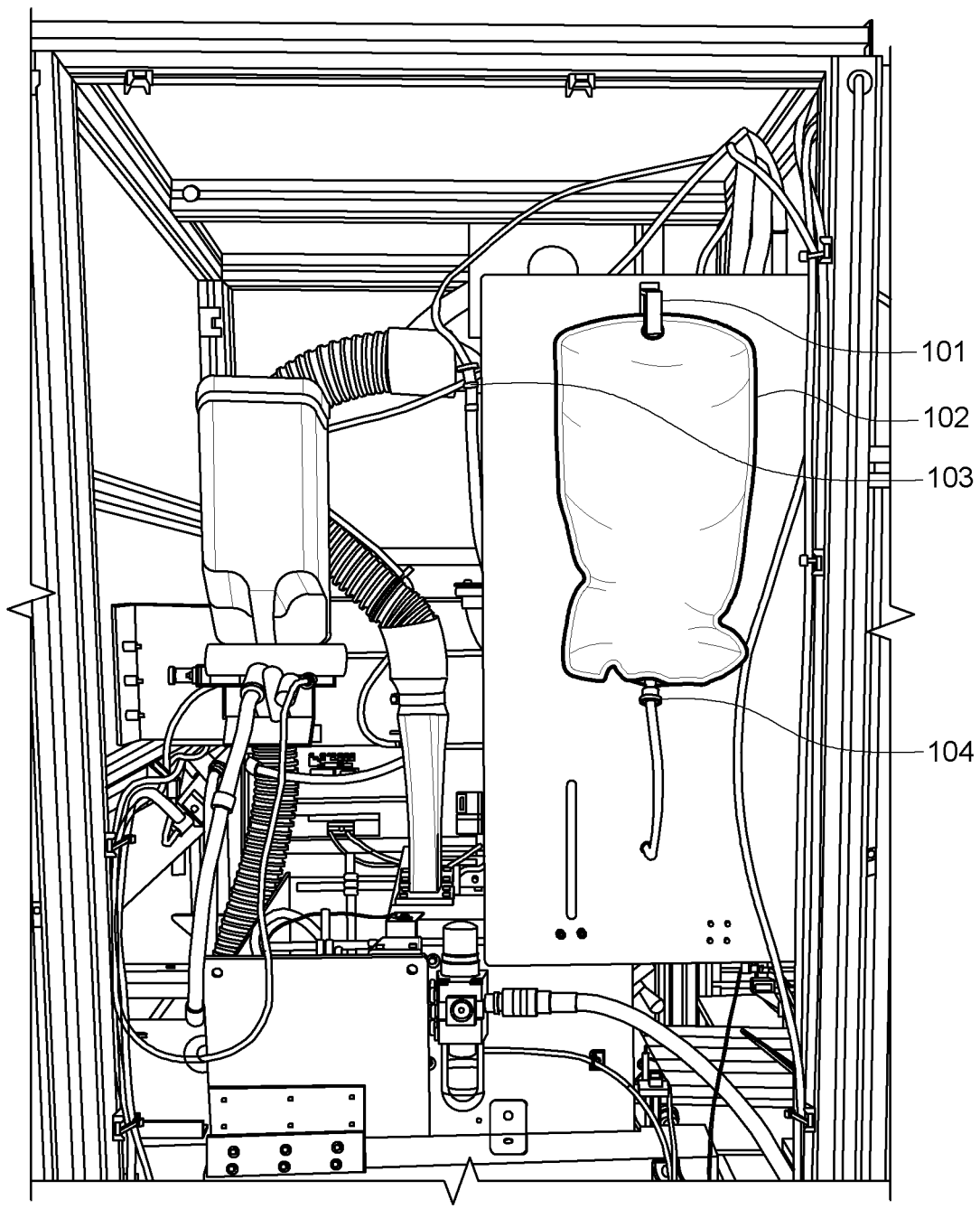
FIG. 1 shows an embodiment of the present invention.

FIG. 1 shows an embodiment of the present invention. A bulk ink bag 102 hangs from a weight scale attachment 101. The weight of the bag is continuously monitored by a controller to determine the quantity of ink remaining in the bag and to signal when a bag change is required.

A quick disconnect nozzle 104 at the bottom of the bag is self-sealing and can be connected by hand without requiring any tools. This makes connecting and disconnecting the bag from the wetting fluid delivery system easy. Since the valve is self-sealing, this can be done without any fluid leaking, and without introducing air into either the bag or fluid delivery system. It also means that the bag remains sealed, allowing partially used bags to be removed and re-connected later.

Any air introduced into the fluid delivery system can be removed using a gravity fed de-bubbling system 103. The de-bubbling system also provides a visual indication of the amount of air in the system, and indicates when the air in the system needs to be purged. There is first tubing that fluidly connects the self-sealing nozzle to the de-bubbling device, and second tubing that fluidly connects the de-bubbling device and the CBAM system (ink cartridges).

Because the system maintains a reservoir of fluid in the ink cartridges, and the system is sealed from air incursion, the fluid bag can be changed without disrupting printing process.

Figure 2:
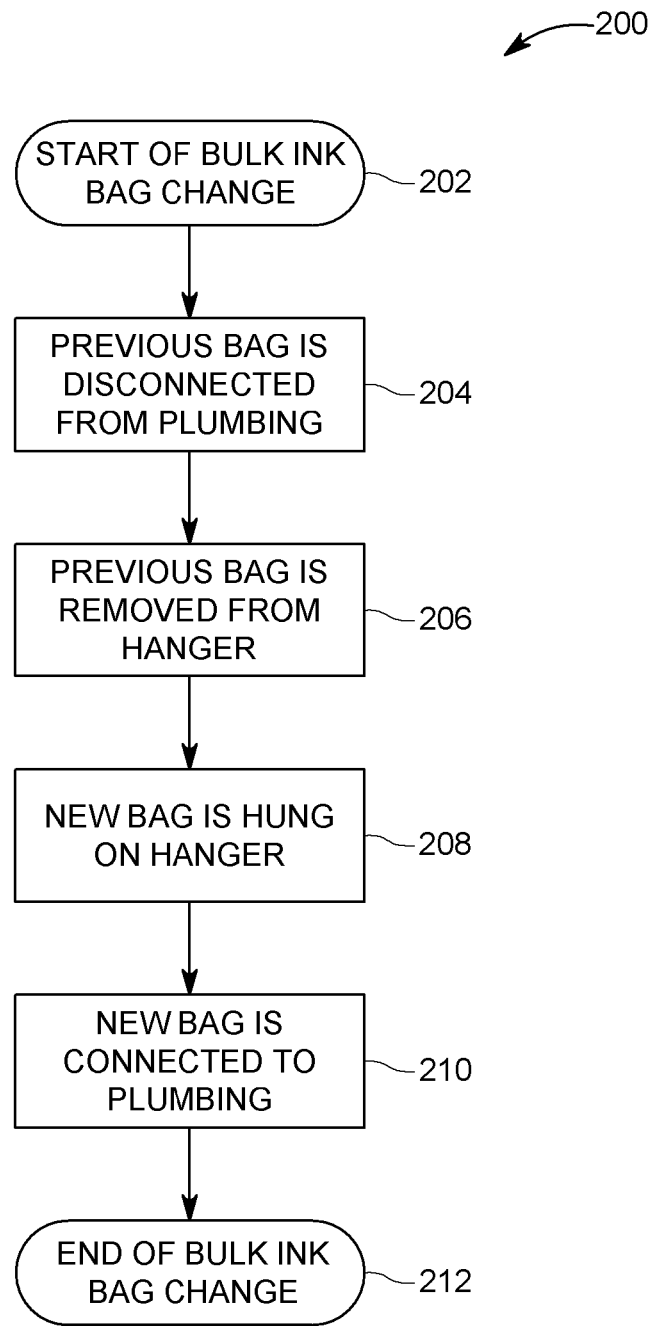
FIG. 2 is a flow chart of the steps in changing a bulk fluid bag.

FIG. 2 shows a block diagram 200 of the bulk ink change process. At the start of the process 202 the weight scale 101 (FIG. 1) has indicated the bag needs replacing. The old bag is disconnected from the plumbing 204 by releasing the quick disconnect nozzle 104 (FIG. 1). The seal assures no ink spills at this point. The old bag can then be removed 206, and a fresh full bag can be hung on the hook 208. Finally, the new bag is connected 210 to the plumbing by reconnecting the quick disconnect nozzle 104 (FIG. 1). The bulk ink bag change process is thus complete 212 without spilling any ink and without interrupting the inking process, since there is enough ink in the inkjet heads to run the process during the bulk bag change.

In summary, the present invention includes a method of changing fluid bags in a CBAM process without disrupting the process by providing a hook attached to a load cell constructed to hang a fluid bag; reading the load cell to determine weight of the fluid bag; using the weight to indicate an amount of fluid in the fluid bag; providing a quick-disconnect, self-sealing nozzle on the fluid bag; disconnecting tubing from the quick-disconnect, self-sealing nozzle when the amount of fluid in the bag is less than a predetermined amount; replacing the fluid bag with a second full fluid bag; reconnecting the quick-disconnect, self-sealing nozzle to the tubing. This is all done without disrupting the CBAM process.

The present invention also includes an apparatus to allow fluid bag changing in a (CBAM) system without disruption by providing a scale that measures fluid bag weight with a hook attached to the scale; at least one fluid bag having a quick-disconnect, self-sealing nozzle, and a gravity fed de-bubbling device in fluid communication with the fluid bag, the de-bubbling device having a sight constructed to determine an amount of air in the system. The system plumbing can be quickly disconnected and reconnected to the quick-disconnect nozzle while the system is running. A controller in the CBAM system, or a separate controller can read the load cell and signal when a bag change is needed.

While the written description above uses the example of sheets as the substrate, the principles of the invention described herein have equal applicability to web or roll based feeding of substrate material.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A system to allow fluid bag changing in a composite-based additive manufacturing (CBAM) system without disruption comprising:
    a scale configured to measure fluid bag weight;
    a hook attached to the scale;
    at least one fluid bag having a quick-disconnect, self-sealing nozzle, the fluid bag in fluid communication with one or more ink cartridges;
    a gravity fed de-bubbling device in fluid communication with the fluid bag, the de-bubbling device having a sight constructed to determine an amount of air in the system.

2. The system of claim 1, further comprising tubing attachable to said self-sealing nozzle connected between the fluid bag and the one or more ink cartridges.

3. The system of claim 1, further comprising first tubing that fluidly connects the self-sealing nozzle to the de-bubbling device, and second tubing that fluidly connects the de-bubbling device and the one or more ink cartridges.

4. A gravity feed fluid delivery system in a composite-based additive manufacturing (CBAM) process that allows seamless fluid bag changing comprising:
    a hook constructed to hang a fluid bag, the hook attached to a load cell configured to measure and monitor bag weight;
    a self-sealing nozzle attached the fluid bag at a bottom location;
    wherein, the self-sealing nozzle is constructed to be attached to, and disconnected from, tubing that is in fluid communication with one or more ink cartridges without tools and without leaking; and the load cell is configured to indicate an amount of fluid in the fluid bag;
    whereby, fluid bags, full, empty, or partially full can be connected and disconnected from the system without disrupting system operation.

5. The fluid changing system of claim 4 further comprising a gravity fed de-bubbling device configured to remove bubbles from the fluid.

6. The fluid changing system of claim 5, further comprising a sight in the de-bubbling device allowing an estimate of air in the system.

* * * * *